G. P. KOHLHAAS.
SEED CORN TIPPER.
APPLICATION FILED DEC. 1, 1915.
1,221,336.
Patented Apr. 3, 1917.
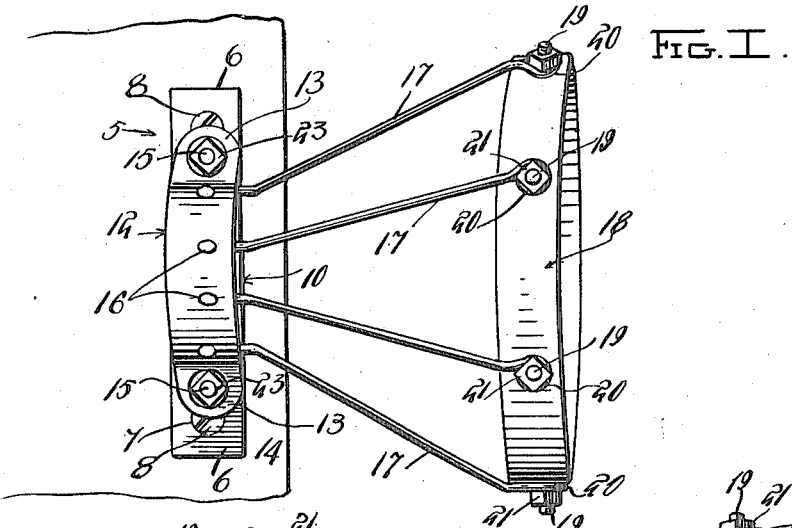
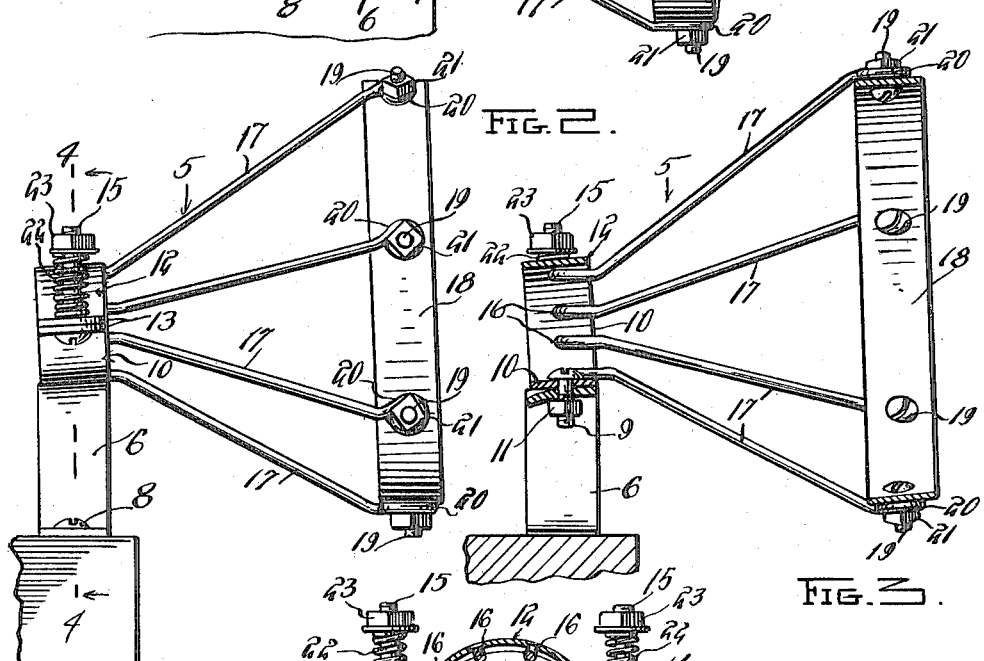
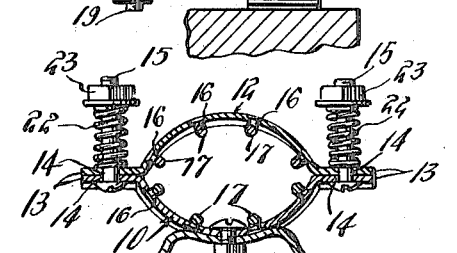
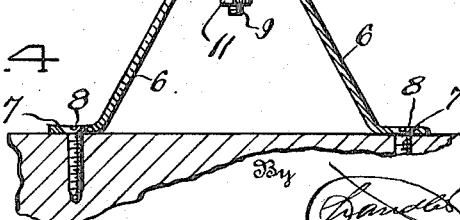
Witnesses
Inventor
G. P. Kohlhaas.
By
Attorneys

UNITED STATES PATENT OFFICE.

GEORGE P. KOHLHAAS, OF GREENE, IOWA.

SEED-CORN TIPPER.

1,221,336.

Specification of Letters Patent.

Patented Apr. 3, 1917.

Application filed December 1, 1915. Serial No. 64,504.

*To all whom it may concern:*

Be it known that I, GEORGE P. KOHLHAAS, a citizen of the United States, residing at Greene, in the county of Butler, State of Iowa, have invented certain new and useful Improvements in Seed-Corn Tippers; and I do hereby declare the following to be a full, clear, and exact description of the invention, such as will enable others skilled in the art to which it appertains to make and use the same.

My invention relates to corn tippers, and the object thereof, is to provide a device for removing the undersized or nub kernels from the outer end of the ears of corn, before placing the ear in a shelling machine, so that the remaining perfect kernels will be suitable for seeding or milling.

Another object is to provide a device by the use of which the ears of corn of various shapes may be easily and quickly shelled and which comprises means for adjustment to accommodate ears of the largest size without the attention of the operator during the operation.

A further object of the invention is to provide a new article of manufacture in a hand corn-sheller which will be simple of construction and operation and which may be manufactured and sold at a low price.

The invention consists of the novel features, details of construction and combination of parts which hereinafter will be more particularly set forth, illustrated in the accompanying drawings and pointed out in the appended claims.

Referring to the drawings, forming a part of the application:

Figure 1, is a top plan view.

Fig. 2, is a side elevation.

Fig. 3, is a transverse sectional view.

Fig. 4, is a sectional view on line 4—4 of Fig. 2.

Referring to the accompanying drawings, the invention comprises a frame 5, which may be attached to a suitable support by the bracket 6, which latter is provided with openings 7, through which pass the securing bolts, or screws 8. A bolt 9, passes through the bracket 6, at its medial portion, and takes into an aperture provided therefor in the plate 10, and constitutes means whereby the said frame is supported, a nut 11, being arranged on said bolt 9, and when adjusted serves to hold the bracket and plate 10, together.

The plate 10 and a plate 12, of similar construction, are each provided with alined ears 13, which are apertured at 14, for the reception of the adjusting bolts 15, which will later be more fully described.

The plates 10 and 12, inwardly of their points of connection are outwardly bowed and form a relatively restricted mouth opening of the frame, and the said plates are provided with a series of spaced apertures 16, adapted for the reception of the inner ends of the divergent arms 17, which are formed of wire, and have their outer ends connected to the metal ring 18. The connecting bolts 19, pass through apertures in the ring 18, and the loops 20, of the arms 17; and nuts 21, are arranged on the bolts 19, which, when adjusted, bind against the arm loops 20, and serve to hold the arms snug against the said ring 18. This ring together with the outer ends of the wire arms 17, form the entrance opening of the frame and into which the ears of corn are admitted to be tipped.

The divergent arms 17, as will be seen, are secured to the outer face of the ring 18, and taper inwardly and immediately above their lower point of connection, again curve slightly inwardly and then slightly outwardly and are connected to the inner face of the plates 10 and 12. At this point the arms 17, engage the nub end of the ear of corn which has been inserted into the frame to be shelled, and I accommodate ears of corn of different sizes and shapes between the plates 10 and 12, by loosely mounting the adjusting bolts 15, in the ears 13, of the plates, and I arrange spiral springs 22 thereon, between the ears 13 of plate 12, and the adjusting nuts 23 on the bolts, so that the transverse movement of the plates with respect to each other, and the frame, is regulated by the said springs 22. The tension of the springs 22, is regulated by the nuts 23, and when the same are screwed to compress the springs, the plates are adjusted for the very small ears.

Should the device be employed for shelling an entire ear of corn, for instance popcorn, the nuts 23 would be adjusted on the threaded bolts 15, to compress the springs 22, and thereby limit the movement of the plate 12, and only allowing a small ear to pass through.

When the ordinary sized ears of corn are to be tipped, an adjustment is made which will be proper for all of that general or uniform size, but should an ear of large size be tipped, the proper adjustment of the springs 22 may be made to permit of the transverse movement of the plate 12.

It is obvious that in a device of this particular character, I have provided means for tipping ears of corn of different shapes and sizes and wherein the adjustment is exceedingly simple and easy of access.

From the foregoing description taken in connection with the accompanying drawings, the advantages of construction and the method of operation will be readily apparent to those skilled in the art to which the invention appertains, and while I have described the principle of operation, of the invention, together with the device which I now consider to be the embodiment thereof, I desire to have it understood that the device shown is merely illustrative, and that such changes may be made when desired, as are within the scope of the claims appended hereto.

Having thus described by invention what I claim as new is:—

1. A corn tipper comprising in combination a split ring, means resiliently holding the sections of said split ring together, a closed annulus, a plurality of arms having their ends connected to said annulus and converging toward the split ring, the opposite ends of said arms being secured within said split ring, and each having an inwardly elevated projection, said projections forming an annular series of kernel engaging elements.

2. A corn tipper comprising in combination a bracket supported ring, a plurality of arms each having one extremity secured within the ring and extending thence in convergent relation to form an annular series of kernel engaging elements, an annulus of larger diameter than said ring, the free ends of said arms diverging uniformly from said kernel engaging elements and being secured at their extremities to said annulus.

In testimony whereof, I affix my signature, in the presence of two witnesses.

GEORGE P. KOHLHAAS.

Witnesses:
D. H. ELLIS,
P. C. PERRIN.

Copies of this patent may be obtained for five cents each, by addressing the "Commissioner of Patents, Washington, D. C."